June 9, 1953        W. H. SILVER        2,641,172
AUTOMATIC DEPTH CONTROL FOR AGRICULTURAL IMPLEMENTS
Original Filed June 19, 1941
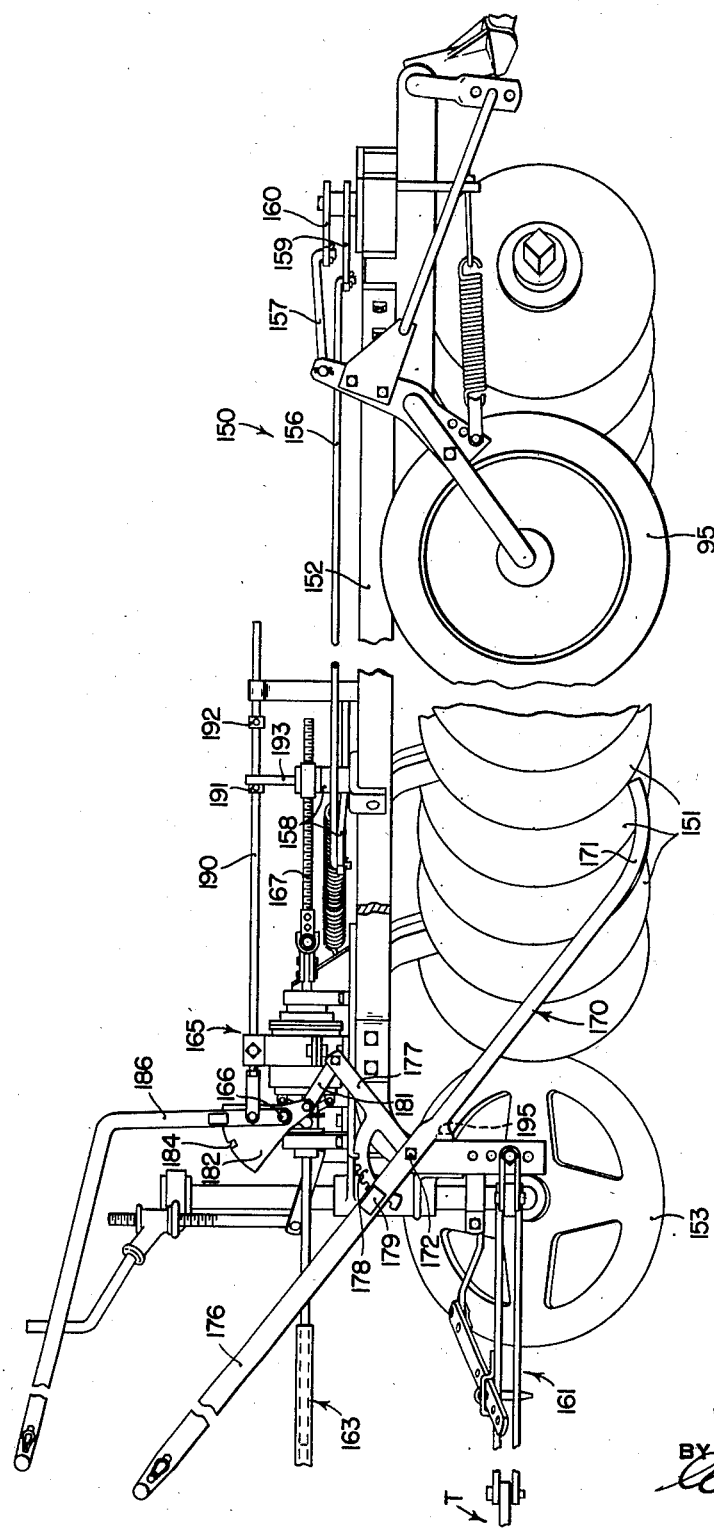
INVENTOR
WALTER H. SILVER
ATTORNEYS Patented June 9, 1953

2,641,172

UNITED STATES PATENT OFFICE 2,641,172

AUTOMATIC DEPTH CONTROL FOR AGRICULTURAL IMPLEMENTS

Walter H. Silver, Moline, Ill., assignor to Deere & Company, Moline, Ill., a corporation of Illinois Original application June 19, 1941, Serial No. 398,781. Divided and this application July 23, 1945, Serial No. 606,652

3 Claims. (Cl. 97—46.03)

This application is a division of my co-pending application, Serial No. 398,781, filed June 19, 1941, for "Automatic Depth Control for Agricultural Implements," now U. S. Patent No. 2,405,334.

The present invention relates generally to agricultural machines and more particularly to ground working implements in which ground working tools are provided.

The object and general nature of the present invention is the provision of depth controlling means deriving operating energy from the tractor engine and automatically responsive to changes in the depth of operation of the tool or tools, whereby substantially constant depth of operation may be maintained automatically at any desired depth. More specifically, it is a feature of this invention to provide an implement having a movable ground engaging shoe or gauge member, movement of which relative to the implement automatically controls the application of power from the tractor to the depth adjusting mechanism so that if it should occur that the tools momentarily tend to run deeper or more shallow than the desired setting, the mechanism is operative to readjust the depth controlling means so as to momentarily readjust the depth of operation so as to bring the tools back to the desired position.

A further important feature of this invention is the provision of automatic depth gauging mechanism which utilizes depth controlling mechanism which does not interfere with the freedom of movement of the tool or tools relative to the tractor. It is a further characteristic of this invention that the automatic depth controlling mechanism may be incorporated in towed implements.

These and other objects and advantages of the present invention will be apparent to those skilled in the art after a consideration of the following detailed description taken in conjunction with the accompanying drawings which show illustrative embodiments of this invention.

In the drawings, the single figure is a side view of a towed implement of the tiller type, in which power is derived from the tractor for operating suitable depth controlling means under the control of depth responsive gauge means.

Referring now to the drawing, which shows the principles of the present invention incorporated in a power-actuated depth control for disk tillers, the implement shown in this figure comprises a disk tiller of the type disclosed in my prior Patent No. 1,928,952, dated October 3, 1933, to which reference may be made for details of construction. Briefly, the disk tiller, which is indicated in its entirety by the reference numeral 150, comprises a plurality of aligned disks 151 supported by suitable standards that are carried between generally diagonally extending frame bars 152. The latter constitutes the frame of the implement and are supported by means of a front furrow wheel 153, a rear land wheel 95 and a rear furrow wheel (not shown). The frame 152 and the disks 151 constitute tool means that are adapted to be raised and lowered relative to the associated ground wheels 95 and 153, and broadly considered the disks 151 represent any suitable operating means that may be raised and lowered into various positions, as desired. Through suitable connections, including shiftable links 156, 157, and bell cranks 158, 159 and 160 mounted on the diagonal frame bars 152, the frame may be raised and lowered relative to the wheels for adjusting the depth of operation of the disks 151, which are carried by said frame, and raising and lowering them into and out of transport position. According to the above-mentioned prior patent, the disks 151 are raised and lowered by power derived from the tractor T to which the implement 150 is connected to be propelled thereby, as through suitable hitch means 161. The power connections just referred to include a telescoping power shaft 163 which delivers power to a reverse gear mechanism 165, and the latter in turn, under the control of a rock shaft 166, acts through a screw shaft 167 to shift the bell crank 158 in one direction or the other, or hold the same in any position of adjustment. As fully disclosed in my prior patent, rocking the shaft 166 in one direction or the other serves to drive the screw shaft 167 in one direction or the other, and holding the rock shaft 166 in a neutral position serves to hold the shaft 167 against rotation in either direction.

According to the principles of the present invention, I provide means for controlling the depth adjusting rock shaft 166 by means that is responsive to changes in the depth of operation of the disk 151. To this end, I provide a ground engaging shoe member 170 having a ground engaging element 171 at its rear end and pivotally mounted, as at 172, for generally vertical swinging movement relative to the frame of the disk tiller 150. The shoe member 170 is extended forwardly and upwardly, beyond the pivot 172, to form a depth adjusting lever 176. An arm 177 having a notched sector 178 is mounted on the pivot 172 and is adapted to be connected with the hand lever 176 by the usual detent mechanism 179. The arm 177 is connected by a link 181 to the lower end of an arm 182 which is formed as a sector having a single notch 184 with which detent mechanism on a hand lever 186 is adapted to engage. The hand lever 186 is shown in its disengaged position, but normally it is in a position in which it is engaged with the notch 184. The sector 182 and hand lever 186 constitute the principal portions of an operative connection between the ground-engaging member 170 and the gearing 165 that controls the application of power to the raising and lowering means. The sector 182 constitutes one part that is connected to move with the ground-engaging shoe while the hand lever 186 constitutes the other part that is connected with the aforesaid controlling means. A generally longitudinally shiftable link 190 is connected with the hand lever 186 and carries a pair of lugs 191 and 192 with which an upstanding member 193 on the bell crank 158 is adapted to cooperate to limit the upper and lower positions to which the reverse gear mechansm 165 may be actuated to raise or lower the tools. A stop 195 is formed on the gauge shoe member 170 to limit its lowered position when the tools and the frame 152 are raised into transport position.

In any position of operation, if the disks 151 should tend to be forced upwardly out of the ground, due to the implement striking a hard spot, for example the relative downward movement of the gauge shoe 170 acts through its connection with the rock shaft 166 to turn the latter in a direction to actuate the reverse gear mechanism 165 for the purpose of momentarily lowering the disks 151 relative to the frame. On the other hand, if the disks should tend to run too deep, then the relative upward movement of the gauge member 170, which rides along the ground surface, causes the rock shaft 166 to be rocked in the other direction, raising the disks 151. By this means, therefore, the disks 151 are maintained substantially at a constant depth of operation. Moving the lever 176 into different positions of adjustment causes the gauging element to maintain the disks 151 at different depths of operation. The implement may be raised into transport position by disengaging the hand lever 186 from the sector 182 and swinging the lever 186 rearwardly. This acts to rock the shaft 166 in a direction to cause the gear mechanism 165 to raise the frame and tools. When it is desired to lower the tools, the operator moves the hand lever 186 forwardly, thus actuating the gear mechanism in the other direction. The tools will then lower until the detent mechanism on the hand lever 186 reengages in the notch 184, restoring the control back to the gauge shoe 170.

While I have shown and described above the preferred means in which the principles of the present invention have been incorporated, it is to be understood that my invention is not to be limited to the particular details shown and described above, but that, in fact, widely different means may be employed in the practice of the broader aspects of my invention.

What I claim therefore, and desire to secure by Letters Patent is:

1. For use with an implement including ground engaging supporting means, tool means adapted to be raised and lowered relative to said supporting means, means including reversible clutch means mounted on said implement for raising and lowering said tool means relative to said supporting means, a power takeoff adapted to be continuously operated from a source of power and connected to said raising and lowering means through said reversible clutch means, and means for controlling said reversible clutch means: the improvement comprising ground engaging shoe means, means for pivotally connecting said shoe means with said tool means so as to extend at its lower end downwardly and rearwardly in trailing relation, being thereby responsive to changes in the position of said tool means relative to the ground surface, an arm connected with said shoe means, means for connecting said arm with said clutch controlling means, whereby movement of said shoe means acts through said arm for actuating said clutch controlling means, and means for changing the position of said arm relative to said shoe means so as to change the working position of said tool means.

2. The invention set forth in claim 1, further characterized by said arm being pivotally attached at one end to said shoe means at the point of pivotal connection of said shoe means with said supporting means, a notched quadrant on said arm, and a detent part on said shoe means adapted to register in said notches for adjusting the controlled depth of said tool means, said arm being connected at its other end to said clutch controlling means.

3. For use in an implement adapted to be hitched to a tractor having a power unit thereon and wherein said implement comprises a frame carrying operating means, means on the implement for raising and lowering said frame and said operating means relative to the ground surface, means for operatively connecting said raising and lowering means with the power unit on the tractor to receive power therefrom, and means for controlling the application of power from said unit through said connecting means to said raising and lowering means: a ground-engaging member, means for movably connecting said member with said implement frame, a connection between said ground-engaging member and said controlling means, said connection including two relatively movable parts, one adapted to be disengaged from the other and one connected with said ground-engaging member and the other connected with said controlling means, means fixing said parts in different positions of adjustment, whereby the relation between said ground-engaging means and said power-controlling means may be varied, and means carried by said implement frame and engageable with said ground-engaging means for holding the latter against movement relative to the ground when said parts are disposed in one position of adjustment.

WALTER H. SILVER.

References Cited in the file of this patent

UNITED STATES PATENTS

| Number | Name | Date |
|---|---|---|
| 466,663 | Darby et al. | Jan. 5, 1892 |
| 534,426 | Cooper | Feb. 19, 1895 |
| 1,928,952 | Silver | Oct. 3, 1933 |

FOREIGN PATENTS

| Number | Country | Date |
|---|---|---|
| 294,744 | Germany | May 16, 1914 |
| 520,484 | Great Britain | Apr. 25, 1940 |